2,917,477

AQUEOUS POLYMERIZATION PROCESS USING AMINO ACID CHELATING AGENT AND PRODUCT

Tzeng Jiueq Suen, New Canaan, and Richard L. Webb, Noroton Heights, Conn., assignors to American Cyanamid Company, New York, N.Y., a corporation of Maine No Drawing. Application January 21, 1955
Serial No. 483,426

6 Claims. (Cl. 260—29.6)

This invention relates to aqueous solutions of water-soluble monomers, and to polymers and copolymers thereof. More particularly, this invention relates to stable aqueous solutions of water-soluble monomers in combination with a chelating agent. Further, this invention relates to the polymerization of water-soluble monomeric compounds to form water-soluble polymeric compounds in the presence of a chelating agent.

Certain ethylenically unsaturated monomers or monomer solutions, such as acrylic acid, methacrylic acid, acrylamide and methacrylamide, tend to form insoluble polymers commonly known as popcorn polymers under favorable circumstances. For instance, these monomers readily form popcorn type polymers when in aqueous solution in the presence of stainless steel, nickel metal, rusty iron and the like. Inasmuch as these metals are commonly employed as storage containers for aqueous solutions of the water-soluble monomers, the formation of the insoluble polymers during storage is detrimental to the later use of the aqueous solution of the monomers when employed for the formation of polymeric material. It is known that certain so-called polymerization inhibitors, such as hydroquinone, sodium nitrite, oxides of nitrogen and the like, are able to prevent or minimize the formation of these insoluble popcorn polymers. However, the known inhibitors generally adversely affect the polymerization of the monomers during the formation of polymeric materials. Discolored products, lower conversions or lower degrees of polymerization have been experienced as a result of the use of the known inhibitors.

We have now found that certain chelating compounds stabilize the aqueous solution of water-soluble ethylenically unsaturated compounds without any ill effect on the subsequent polymerization of the compounds during the formation of polymeric materials. In fact, it has been found that the use of these chelating compounds exerts some beneficial effect during the later polymerization reaction. The polymers formed are clearer looking and the degree of polymerization is also enhanced. It is known that, when a metal ion combines with an electron donor, the resulting substance is said to be a complex or coordination compound. If the substance which combines with the metal contains two or more donor groups so that one or more rings are formed, the resulting structure is a chelating compound or metal chelate and the donor is a chelating agent. Without attempting to explain the theory involved in the present invention, it is known that chelating agents that may be employed herein in order to form stable aqueous solutions of certain ethylenically unsaturated compounds and which also exert certain beneficial effects during the subsequent polymerization of the monomeric material are water-soluble salts or esters of an organic amino-carboxylic acid containing in relation to one basic nitrogen atom at least one carboxylic acid group standing in alpha or beta position thereto. Compounds of this type may be defined by the following structural formulas:

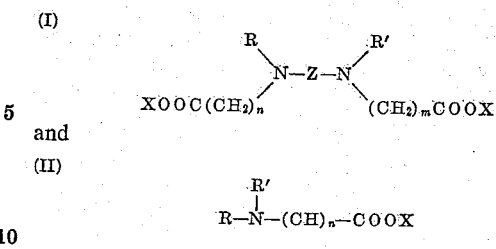

(I) and (II)

In the above-noted formulas Z represents an alkylene group containing from 2 to 3 chain carbon atoms and substituted derivatives thereof such as ethylene, propylene, 1,2-cyclohexane, and the like. $m$ and $n$ are integers of from one to two. X is selected from the group consisting of hydrogen, ammonium and alkali metals such as sodium, potassium, lithium and the like. R and R' are radicals selected from the group consisting of hydrogen, alkyl radicals containing from 1 to 5 carbon atoms, hydroxy substituted derivatives thereof and $(CH_2)_m COOX$ wherein $m$ and X are as previously defined.

Representative compounds of this type are such as ethylene-diamine tetraacetic acid; trimethylenediamine tetraacetic acid; nitrilotriacetic acid; N'-(2-hydroxyethyl)-ethylenediamine-N,N,N'-triacetic acid; 1,2-diaminocyclohexane-N,N,N',N'-tetraacetic acid; 1,3-diamino-2-propanol tetraacetic acid; and 1,2-propylenediamine tetraacetic acid.

The chelating agent may be employed in accordance with the present invention in an amount varying between about 0.01% to about 1% by weight, preferably from about 0.05% to about 0.5% by weight, based on the total weight of the monomers present.

As used in the present invention, water-soluble ethylenically unsaturated monomers, polymers and copolymers thereof are defined as those which are soluble in water to an extent of at least 3%. Specifically, the water-soluble ethylenically unsaturated monomeric compounds to which this invention is applicable are those selected from the group consisting of acrylic acid, methacrylic acid, acrylamide and methacrylamide.

In order that those skilled in the art may more fully understand the inventive concept herein presented, the following examples are given by way of illustration and not limitation unless otherwise noted in the appended claims. All parts are parts by weight.

Example 1

48 parts of acrylamide recrystallized twice from acetone were dissolved in 32 parts of water to form a 60% solution.

To 20 parts of the above solution was added 0.32 part of 0.1 mol solution of tetra-sodium salt of ethylenediamine tetraacetic acid as well as a piece of #316 stainless steel. A second 20 parts were treated with stainless steel only to serve as a control. The samples were stored at 35° C. in screw capped bottles. Within five hours some gel was noted in the control but not in the treated sample. After two weeks the control solution was about 15% polymerized while the treated sample was completely free from polymer.

Example 2

(a) Into a two-liter reactor fitted with a reflux condenser, a thermometer, a stirrer, a gas inlet tube and two dropping funnels were charged 550 parts of water. Into one of the funnels was charged a solution of 100 parts of acrylamide in 125 parts of water and into the other a solution of 0.25 part of ammonium persulfate in 225 parts of water. The water in the reactor was heated to 80° C.

and maintained at approximately this temperature throughout the subsequent reaction. A stream of $CO_2$ was bubbled through the system during the whole course. Approximately 45 parts of each of the solutions in the funnels were charged into the reactor at the start of the reaction. Thereafter, about 30 parts of each of the solutions in the funnels were charged into the reactor every five minutes. After all the reactant and the catalyst solutions were introduced, the reaction mixture was maintained at about 80° C. for 2 hours before being cooled down to room temperature. The Brookfield viscosity at 25° C. of the finished product was found to be 12,400 centipoises. Through iodine number determination, the conversion was found to be above 99%.

(b) Example 2a was repeated with the exception that the acrylamide solution contained 1000 parts per million of tetra-sodium salt of ethylenediamine tetraacetic acid, based on the weight of the monomer. The viscosity at 25° C. of the finished product was 28,500 centipoises. The conversion was above 99%.

(c) Example 2a was repeated with the exception that the acrylamide solution contained 100 parts per million of hydroquinone, based on the weight of the monomer. The viscosity at 25° C. of the finished product was 6,100 centipoises. The conversion was above 99%.

*Example 3*

(a) Acrylamide was polymerized by a continuous process in a five-gallon stainless steel reactor. Acrylamide solution, catalyst solution, isopropyl alcohol, and water were pumped through the reactor. The rate of pumping of all the materials was approximately 5 gallons per hour. The composition of the entire feed was substantially as follows:

| | Parts by weight |
|---|---|
| Acrylamide | 100 |
| Potassium persulfate | 0.1 |
| Isopropyl alcohol | 0.5 |
| Water | 900 |

The reaction temperature was 80° C. The reaction product from the reactor was kept in a holding tank at 80° C. to 90° C. for about 3 hours to complete the polymerization reaction. A highly viscous product was obtained, which contained appreciable quantities of gelled particles.

(b) Example 3a was repeated with the exception that the acrylamide solution contained 1000 parts per million of tetra-sodium salt of ethylenediamine tetraacetic acid, based on the weight of the monomer. The reaction product was clear and contained very little gelled particles.

*Example 4*

A 60% acrylamide solution was prepared as in Example 1. To 6 parts of the above solution was added 0.10 part of a 3.4% solution N,N-bis(B-hydroxyethyl)-glycine and a piece of mild steel. A second 6 parts of the original 60% acrylamide solution were treated with mild steel only to serve as a control. The samples were stored at 35° C. in polyethylene-capped vials. Within 43 hours, seeds of popcorn polymer were noted in the control but not in the treated sample. After 139 hours the control solution was 100% polymerized while the treated sample was less than 0.1% polymerized.

It has been previously stated herein that copolymers, as well as homopolymers which are water-soluble, may be prepared in accordance with this invention. When other ethylenically unsaturated monomeric compounds are copolymerized with the water-soluble ethylenically unsaturated compounds selected from the grouping consisting of acrylic acid, methacrylic acid, acrylamide and methacrylamide, it is only necessary that the latter compound be present in the copolymer in an amount such that the polymeric material is water-soluble as previously defined. The amount of the water-soluble ethylenically unsaturated compound selected from the group consisting of acrylic acid, methacrylic acid, acrylamide and methacrylamide that need be present in order to obtain water-soluble copolymers will vary depending on the other ethylenically unsaturated compounds copolymerized therewith. The amounts of the respective monomeric materials present in the water-soluble copolymer may easily be determined by those skilled in the art. It will be obvious that both water-soluble and water-insoluble ethylenically unsaturated compounds may be copolymerized with the water-soluble ethylenically unsaturated compounds selected from the group consisting of acrylic acid, methacrylic acid, acrylamide and methacrylamide. However, the copolymer formed must be water-soluble. Examples of ethylenically unsaturated compounds that may be copolymerized with the water-soluble ethylenically unsaturated compounds selected from the group consisting of acrylic acid, methacrylic acid, acrylamide and methacrylamide are such as styrene, ring- and side-chain substituted styrenes, e.g., α-methylstyrene; α-chlorostyrene; o-methylstyrene; p-methylstyrene; 2,4-dimethylstyrene; 2,5-dimethylstyrene; 2,4,5-trimethylstyrene; p-ethylstyrene; o-bromostyrene; 2-bromo-4-ethylstyrene; p-isopropylstyrene; 2,4-dichlorostyrene; and the like.

Other specific vinyl compounds which may be mentioned are the vinyl compounds which include ketones such as monovinyl ketone, methyl isopropenyl ketone, ethyl vinyl ketone, propyl vinyl ketone and phenyl vinyl ketone; vinyl carboxylates such as vinyl formate, vinyl acetate, vinyl chloroacetate, vinyl propionate, vinyl bromo propionate, vinyl stearate; vinyl halides such as vinyl chloride, vinyl bromide; even heterocyclic compounds such as vinyl phthalimide, vinyl carbazol, vinyl pyrrolidone; and the like.

Still further, these polymerizable monomers may include allyl or methallyl esters such as allyl acetate, allyl propionate, allyl choroacetate, allyl α-propionate, allyl caproate, allyl levolinate, allyl benzoyl benzoate, allyl benzoate, methallyl acetate, allyl laurate, allyl stearate, allyl esters of vegetable oil fatty acids such as the allyl esters of linseed oil fatty acids, allyl myristate, allyl undecylenate, allyl cyanoacetate and the like.

Other compounds which may also be mentioned are such as acrylonitrile; acrylic acid or methacrylic acid esters of alcohols such as methyl, ethyl, propyl, butyl, isobutyl, amyl, hexyl, cyclohexyl, heptyl, octyl and decyl or esters of nitro alcohols, such as 3-nitro-2-butanol, 2-nitro-3-hexanol, 2-methyl-2-nitro-1-butanol and 2-nitro-2-methylpropyl alcohol and polyhydric alcohols such as ethylene glycol, diethylene glycol, glycerol and the like.

The addition polymerization and/or copolymerization of ethylenically unsaturated compounds in accordance with the present invention are well known in the art. Polymerization of the vinyl groups of the compounds used in this invention is effected with any of the usual peroxygen catalysts, such as tertiary-butyl hydroperoxide, the ammonium, potassium and sodium persulfates. hydrogen peroxide, the alkali metal and ammonium chlorates, perborates, percarbonates and the like. It is frequently advantageous to use a redox catalyst system of oxygen-containing compound with a reducing agent, such as sodium thiosulfate, sodium or potassium bisulfite, hydroquinone, etc., a typical combination being ammonium persulfate and sodium thiosulfate. The quantity of catalyst used is not considered critical and in general from about 0.05% to about 20%, based on the weight of polymerizable monomers, may be used.

We claim:
1. A process for the preparation of a water-soluble thermoplastic addition polymer which comprises adding to a homogeneous aqueous system comprising an aqueous solution of a monomer selected from the group consisting of acrylic acid, methacrylic acid, acrylamide and methacrylamide, a chelating agent selected from the group consisting of the water-soluble salts and esters of a saturated amino carboxylic acid having the formulas:

(I)

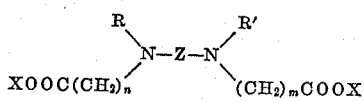

and (II)

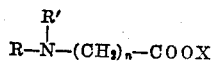

wherein Z represents an alkylene group containing from 2 to 3 chain carbon atoms; X is a substituent selected from the group consisting of hydrogen, ammonium and alkali metals; $m$ and $n$ are integers of from 1 to 2 and R and R' are substituents selected from the group consisting of hydrogen, alkyl radicals containing from 1 to 5 carbon atoms, hydroxy substituted derivatives thereof and a $(CH_2)_m COOX$ radical wherein $m$ and X have the values previously defined, in an amount of from about 0.05% to about 0.5% by weight based on the total weight of the monomers present and polymerizing said monomers with the aid of a catalyst for addition polymerization of ethylenically unsaturated compounds, the system remaining substantially homogeneous throughout the course of polymerization.

2. A process for the preparation of a water-soluble thermoplastic addition polymer which comprises adding to a homogeneous aqueous system comprising an aqueous solution of a monomer selected from the group consisting of acrylic acid, methacrylic acid, acrylamide and methacrylamide, ethylenediamine tetraacetic acid in an amount from about 0.01% to about 1% by weight based on the total weight of the monomers present and polymerizing said monomers with the aid of a catalyst for addition polymerization of ethylenically unsaturated compounds, the system remaining substantially homogeneous throughout the course of polymerization.

3. The process of claim 2 wherein there is present another ethylenically unsaturated compound copolymerizable with said monomer and soluble in water to the extent of at least 3%.

4. An aqueous solution made by the process of claim 2.

5. A process for the preparation of a water-soluble thermoplastic addition polymer which comprises adding to a homogeneous aqueous system comprising an aqueous solution of acrylamide, ethylenediamine tetraacetic acid in an amount from about 0.01% to about 1% by weight based on the total weight of the monomer present and polymerizing said acrylamide with the aid of a catalyst for addition polymerization of ethylenically unsaturated compounds, the system remaining substantially homogeneous throughout the course of polymerization.

6. A process for the preparation of water-soluble polyacrylamide which comprises adding to a homogeneous aqueous system comprising an aqueous solution of acrylamide, a chelating agent selected from the group consisting of the water-soluble salts and esters of an amino carboxylic acid having the formulas:

(I)

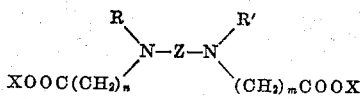

and (II)

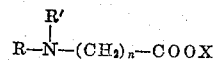

wherein Z represents an alkylene group containing from 2 to 3 chain carbon atoms; X is a substituent selected from the group consisting of hydrogen, ammonium and alkali metals; $m$ and $n$ are integers of from 1 to 2; and R and R' are substituents selected from the group consisting of hydrogen, alkyl radicals containing from 1 to 5 carbon atoms, hydroxy substituted derivatives thereof and a $(CH_2)_m COOX$ radical wherein $m$ and X have the values previously defined, in an amount of from about 0.01% to about 1% by weight based on the total weight of the monomer present and polymerizing said acrylamide with the aid of a catalyst for addition polymerization of ethylenically unsaturated compounds, the system remaining substantially homogeneous throughout the course of polymerization.

References Cited in the file of this patent

UNITED STATES PATENTS

| | | |
|---|---|---|
| 2,105,284 | Groll et al. | Jan. 11, 1938 |
| 2,560,741 | Provost | July 17, 1951 |
| 2,626,944 | Coover et al. | Jan. 27, 1953 |
| 2,667,522 | McElroy | Jan. 26, 1954 |
| 2,758,135 | Miller | Aug. 7, 1956 |
| 2,765,284 | Bersnorth | Oct. 2, 1956 |

FOREIGN PATENTS

| | | |
|---|---|---|
| 584,857 | Great Britain | Jan. 24, 1947 |